US012811245B2

(12) United States Patent
Wu et al.

(10) Patent No.: US 12,811,245 B2
(45) Date of Patent: Nov. 24, 2026

(54) ALUMINUM BATTERY SEPARATOR

(71) Applicant: APh ePower Co., Ltd., Kaohsiung City (TW)

(72) Inventors: Jui-Hsuan Wu, Kaohsiung City (TW); Shih Po Ta Tsai, Kaohsiung City (TW); Chun-Chieh Yang, Kaohsiung City (TW)

(73) Assignee: APh ePower Co., Ltd., Kaohsiung City (TW)

( * ) Notice: Subject to any disclaimer, the term of this patent is extended or adjusted under 35 U.S.C. 154(b) by 737 days.

(21) Appl. No.: 18/326,023

(22) Filed: May 31, 2023

(65) Prior Publication Data

US 2024/0234945 A1 Jul. 11, 2024

(30) Foreign Application Priority Data

Jan. 10, 2023 (TW) ................................ 112100958

(51) Int. Cl.

*H01M 50/429* (2021.01)
*H01M 10/054* (2010.01)
*H01M 50/489* (2021.01)

(52) U.S. Cl.

CPC ..... *H01M 50/4295* (2021.01); *H01M 10/054* (2013.01); *H01M 50/489* (2021.01)

(58) Field of Classification Search

CPC .. H01M 50/414; H01M 50/429; H01M 50/44; H01M 50/4295; H01M 50/489; H01M 10/054

See application file for complete search history.

(56) References Cited

U.S. PATENT DOCUMENTS

| | | | |
|---|---|---|---|
| 2016/0322621 A1 | 11/2016 | Umeyama et al. |
| 2022/0311092 A1 | 9/2022 | Lee et al. |

FOREIGN PATENT DOCUMENTS

| | | |
|---|---|---|
| CN | 101764258 | 6/2010 |
| CN | 103825045 | 5/2014 |
| EP | 3716301 | 9/2020 |
| JP | 2005063684 | 3/2005 |
| JP | 2012132121 | 7/2012 |
| JP | 2021174730 | 11/2021 |
| TW | 202105801 | 2/2021 |
| WO | 2016170756 | 10/2016 |
| WO | 2019116959 | 6/2019 |
| WO | 2021125980 | 6/2021 |
| WO | 2023199868 | 10/2023 |

OTHER PUBLICATIONS

Giuseppe Antonio Elia et al., "Polyacrylonitrile Separator for High-Performance Aluminum Batteries with Improved Interface Stability" with the Supporting Information, Applied Materials & Interfaces, Oct. 18, 2017, pp. 38381-38389 and pp. S-1 to S-9, vol. 9, No. 44.

"Search Report of Europe Counterpart Application", issued on Jun. 4, 2024, pp. 1-9.

"Office Action of Japan Counterpart Application", issued on Sep. 30, 2024, p. 1-p. 4.

"Office Action of Taiwan Counterpart Application", issued on Sep. 12, 2023, p. 1-p. 5.

*Primary Examiner* — Sarah A. Slifka
(74) *Attorney, Agent, or Firm* — JCIPRNET

(57) ABSTRACT

An aluminum battery separator, including an air-permeable material, is provided. An air permeability of the air-permeable material is between 0.1 sec/100 ml and 50 sec/100 ml, and the air-permeable material includes a fiber material other than glass fiber.

8 Claims, No Drawings

ALUMINUM BATTERY SEPARATOR

CROSS-REFERENCE TO RELATED APPLICATION

This application claims the priority benefit of Taiwan application serial no. 112100958, filed on Jan. 10, 2023. The entirety of the above-mentioned patent application is hereby incorporated by reference herein and made a part of this specification.

BACKGROUND

Technical Field

The disclosure relates to a battery separator, and in particular to an aluminum battery separator.

Description of Related Art

Generally speaking, based on the charging and discharging mechanism of the aluminum battery, when the separator is not completely infiltrated with the electrolyte, the active substances in the electrolyte cannot be effectively transferred during the charging and discharging process, which causes excessive internal resistance of the aluminum battery, thereby affecting the performance. Therefore, how to design an aluminum battery separator that can effectively infiltrate the electrolyte to improve the performance of the aluminum battery is a real challenge.

SUMMARY

The disclosure provides an aluminum battery separator, which has preferable chemical resistance and can reduce metal deposition while effectively infiltrating an electrolyte, thereby improving the performance of an aluminum battery and prolonging the life of the aluminum battery.

An aluminum battery separator of the disclosure includes an air-permeable material. An air permeability of the air-permeable material is between 0.1 sec/100 ml and 50 sec/100 ml, and the air-permeable material includes a fiber material other than glass fiber.

In an embodiment of the disclosure, the fiber material includes a fiber non-woven material or a fiber woven material.

In an embodiment of the disclosure, the air-permeable material includes cellulose, polyacrylonitrile (PAN), cellulose acetate, aramid, polyphenylene sulfide (PPS), and polyvinylalcohol dimethylformal.

In an embodiment of the disclosure, the air-permeable material is composed of a single material instead of a composite film.

In an embodiment of the disclosure, the single material is cellulose or polyacrylonitrile.

In an embodiment of the disclosure, a fiber diameter of the air-permeable material is between 0.1 μm and 20 μm.

In an embodiment of the disclosure, an areal density of the air-permeable material is between 0.1 $g/m^2$ and 30 $g/m^2$.

In an embodiment of the disclosure, the air-permeable material is not a pore-forming material.

In an embodiment of the disclosure, a contact angle of the air-permeable material is not greater than 90 degrees.

In an embodiment of the disclosure, the air-permeable material does not include polyethylene (PE) or polypropylene (PP).

Based on the above, the aluminum battery separator of the disclosure is made of the air-permeable material with the air permeability of between 0.1 sec/100 ml and 50 sec/100 ml and the fiber material other than glass fiber by the selection of materials. The aluminum battery separator has preferable chemical resistance and can reduce metal deposition while effectively infiltrating the electrolyte, thereby improving the performance of the aluminum battery and prolonging the life of the aluminum battery.

In order for the features and advantages of the disclosure to be more comprehensible, the following specific embodiments are described in detail in conjunction with the drawings.

DESCRIPTION OF THE EMBODIMENTS

In order for the content of the disclosure to be easier to understand, the following specific embodiments are given as examples in which the disclosure can actually be implemented. For the sake of clarity, many practical details are described in the following description. It should be understood, however, that the practical details should not be used to limit the disclosure. In other words, in some implementations of the disclosure, the practical details are unnecessary.

Unless otherwise defined, all terms (including technical and scientific terms) used herein have the same meaning as commonly understood by persons of ordinary skill in the art to which the disclosure belongs.

Unless otherwise stated, the term “between” used in the specification to define a value range is intended to cover a range equal to and between the stated endpoint values. For example, a size range between a first value and a second value means that the size range may cover the first value, the second value, and any value between the first value and the second value.

In the following detailed description, for purposes of illustration and not limitation, exemplary embodiments disclosing specific details are set forth in order to provide a thorough understanding of various principles of the disclosure. However, it will be apparent to persons of ordinary skill in the art that the disclosure may be practiced in other embodiments that depart from the specific details disclosed herein, having the benefit of the disclosure. Moreover, the description of conventional devices, methods, and materials may be omitted so as not to obscure the description of the various principles of the disclosure.

An aluminum battery separator of the embodiment includes an air-permeable material. In addition, the aluminum battery separator of the embodiment is made of the air-permeable material with an air permeability of between 0.1 sec/100 ml and 50 sec/100 ml and a fiber material other than glass fiber by the selection of materials. The aluminum battery separator has preferable chemical resistance and can reduce metal deposition while effectively infiltrating an electrolyte, thereby improving the performance of an aluminum battery and prolonging the life of the aluminum battery. Here, the electrolyte may be any suitable ionic liquid (for example, EMIC, BMIC, etc.) that may be applied to the aluminum battery, and the disclosure is not limited. The air permeability is represented by a Gurley value.

In some embodiments, the fiber material includes a fiber non-woven material or a fiber woven material. For example, the air-permeable material includes cellulose, polyacrylonitrile, cellulose acetate, aramid, polyphenylene sulfide, and polyvinylalcohol dimethylformal, but the disclosure is not limited thereto. Any suitable air-permeable material belongs to the protection scope of the disclosure as long as the air permeability is between 0.1 sec/100 ml and 50 sec/100 ml.

Furthermore, when glass fiber is used as the material of the aluminum battery separator, during a continuous charging and discharging process, the electrolyte produces metal deposition on a negative electrode and the separator through redox. In this way, metal dendrites are formed in severe cases to conduct a positive electrode and the negative electrode, causing the separator to fail, which affects the performance and the life of the aluminum battery. Therefore, the embodiment explicitly excludes the use of glass fiber to effectively slow down dendrite puncture and reduce metal deposition, thereby preventing the conduction of the positive and negative electrodes to increase the life and the performance of an aluminum battery cell.

In some embodiments, due to hydrophobic properties, a polyethylene or polypropylene material cannot effectively infiltrate when used in the aluminum battery. When the separator is not completely infiltrated, the active substances in the electrolyte cannot be effectively transferred during when the aluminum battery is charged and discharged, which causes excessive battery internal resistance, thereby affecting the performance of the aluminum battery. Therefore, the aluminum battery separator not including the separator with the polyethylene or polypropylene material generally applied to lithium battery industries can more effectively improve the performance of the aluminum battery. In addition, the aluminum battery separator not including the separator with the polyethylene or polypropylene material generally applied to lithium battery industries can also prevent the separator with the aforementioned material from being dissolved by the electrolyte (for example, an ionic liquid) of the aluminum battery, but the disclosure is not limited thereto.

In some embodiments, the electrolyte in the aluminum battery system is usually an ionic liquid, and the viscosity of the ionic liquid is relatively high. When a polymer pore-forming thin film is used as the separator, the separator is also not completely infiltrated, which increases the internal resistance of the aluminum battery, affecting the performance of the aluminum battery. Therefore, the air-permeable material may not be a pore-forming material to more effectively improve the performance of the aluminum battery, but the disclosure is not limited thereto.

Furthermore, the air-permeable material is composed of a single material instead of a composite film, wherein the single material is cellulose or polyacrylonitrile to have better infiltration ability and chemical resistance. The details are described in Table 1 and Table 2 below.

In Table 1, the infiltration ability of the separator can be known through the measurement of the contact angle and the analysis of the droplet absorption time. It can be seen from Table 1 that the separator with a cellulose or polyacrylonitrile material can instantly absorb water droplets, so the contact angle cannot be measured. Therefore, the cellulose or polyacrylonitrile material may be regarded as a hydrophilic material, which is conducive to the infiltration of the electrolyte. However, for the polyethylene or polypropylene material, the contact angle is >90 degrees, so the polyethylene or polypropylene material is a hydrophobic material, which is not conducive to the infiltration of the electrolyte. Therefore, the contact angle of the air-permeable material of the disclosure is not greater than 90 degrees. In addition, it can also be seen from Table 1 that the separators in the form of fibers all have faster droplet absorption rates, and the infiltration abilities are also better than those of the separators with pore-forming thin film materials.

TABLE 1

| Separator | Contact angle (°) | Droplet absorption rate (s/1 μL) |
|---|---|---|
| Cellulose | NA | Instantaneous |
| Polyacrylonitrile | NA | Instantaneous |
| Polyethylene (pore-forming thin film) | 126 | >120 sec |
| Polypropylene (pore-forming thin film) | 113 | >120 sec |
| Polypropylene (fiber thin film) | 119 | 28 sec |

In Table 2, the separators with different materials were cut into 5 cm long and 1 cm wide sheets, soaked in ionic liquid electrolyte (EMIC), and respectively placed at room temperature (25° C.) and high temperature (80° C.) environments to observe the chemical resistance of polymer in the ionic liquid electrolyte. It can be seen from Table 2 that the polyethylene or polypropylene material dissolved in the electrolyte within 4 days at room temperature and is not suitable for the ionic liquid electrolyte system, while the cellulose or polyacrylonitrile material was insoluble in the electrolyte at room temperature, so the cellulose or polyacrylonitrile material has advantages in application to the aluminum battery separator.

TABLE 2

| Material | Brand, product name | No. of days of dissolution at room temperature | No. of days of dissolution at high temperature |
|---|---|---|---|
| Polypropylene | FORESIGHT ENERGY TECHNOLOGIES CO., LTD., Multi-layer Separator | 4 days | <1 day |
| Polyethylene | SHINING ENERGY CO., LTD., W-SCOPE | 4 days | <1 day |
| Cellulose | NIPPON KODOSHI CORPORATION, TF4850 | Insoluble (>30 days) | Insoluble (>30 days) |
| Cellulose | NIPPON KODOSHI CORPORATION, TBL4825 | Insoluble (>30 days) | Insoluble (>30 days) |
| Polyacrylonitrile | PARDAM NANO4FIBERS, NnF MBRANE ®-PAN | Insoluble (>30 days) | — |

In some embodiments, the fiber diameter of the air-permeable material is between 0.1 μm and 20 μm, and the areal density of the air-permeable material is between 0.1 $g/m^2$ and 30.0 $g/m^2$, but the disclosure is not limited thereto.

Hereinafter, with reference to Example 1 and Comparative Example 1, the efficacy of the aluminum battery separator of the disclosure applied to the aluminum battery will be described in more detail. In addition, although Example 1 is described below, the details of the materials used, the process, etc. may be appropriately changed without exceeding the scope of the disclosure, and the disclosure should not be limitedly interpreted by the examples described below.

Comparative Example 1

First, aluminum foil was used for cutting to obtain a negative electrode (with a thickness 0.05 mm and a size 88 mm×148 mm), and graphite slurry was coated on nickel foil (with a thickness 0.03 mm and a size 85 mm×145 mm) to obtain a positive electrode. Next, a glass fiber filter paper (LIH FENG JIING ENTERPRISE CO., LTD., product name YF100, air permeability 4.3 sec/100 ml) was cut to prepare a separator. Then, the negative electrode, the separator, and the positive electrode were arranged in this order. An aluminum plastic film was placed and an electrolyte (aluminum chloride/1-ethyl-3-methylimidazolium chloride, wherein the molar ratio was 1.8:1) was injected to be then packaged. An aluminum battery of Comparative Example 1 was obtained.

Comparative Example 2

According to the preparation manner of the aluminum battery of Comparative Example 1, the difference was that the separator was replaced with a separator with a polypropylene material (FORESIGHT ENERGY TECHNOLOGIES CO., LTD., product name Multi-Layer Composite Material Separator, air permeability 210 sec/100 ml). An aluminum battery of Comparative Example 2 was obtained.

Comparative Example 3

According to the preparation manner of the aluminum battery of Comparative Example 1, the difference was that the separator was replaced with a separator with a polyethylene terephthalate (PET) material (TEIJIN LIMITED, product name 012TH-10, air permeability 0.05 see/100 ml). An aluminum battery of Comparative Example 3 was obtained.

Example 1

According to the preparation manner of the aluminum battery of Comparative Example 1, the difference was that the separator was replaced with a cellulose separator (NIPPON KODOSHI CORPORATION, product name TF4850, air permeability 20 sec/100 ml). An aluminum battery of Example 1 was obtained.

Coulombic efficiency of Example 1 and Comparative Example 1 was tested and the cycle number with the coulombic efficiency lower than 80% was calculated. An electrochemical workstation of BioLogic (BioLogic BCS-815) was used to perform a charging and discharging test on the aluminum battery obtained in Example 1. Comparative Example 1, and Comparative Example 2. The maximum discharge capacity was measured at a charge and discharge rate of 4C. The results are shown in Table 3. The following conclusions may be drawn from the results of Table 3. Comparing Example 1 with Comparative Example 1, the cycle life may be effectively increased to about 6 times, while Comparative Example 2 cannot be charged and discharged normally since the electrolyte cannot infiltrate. In addition, although Comparative Example 3 may be charged and discharged, the pore size of the separator is too large and the air permeability value is low (less than 0.1 sec/100 ml), causing the impedance between the positive and negative electrodes to be too low such that the coulombic efficiency does not reach 80%.

TABLE 3

| | Separator material | Air permeability | Cycle number with coulombic efficiency lower than 80% |
|---|---|---|---|
| Comparative Example 1 | YF100 (glass fiber) | 4.3 | 11 |
| Comparative Example 2 | Polypropylene | 210 | 0 |
| Comparative Example 3 | Polyethylene terephthalate | 0.05 | 0 |
| Example 1 | Cellulose | 20 | 60 |

It should be noted that in the above content, other unspecified compositions and specifications of the aluminum battery should be obtained by persons of ordinary skill in the art of the disclosure according to any content covering the spirit and the scope included in the appended claims, as long as the separator is placed between the positive electrode and the negative electrode of the aluminum battery, the same is within the protection scope of the disclosure.

In summary, the aluminum battery separator of the disclosure is made of the air-permeable material with the air permeability of between 0.1 sec/100 ml and 50 sec/100 ml and the fiber material other than glass fiber by the selection of materials. The aluminum battery separator has preferable chemical resistance and can reduce metal deposition while effectively infiltrating the electrolyte, thereby improving the performance of the aluminum battery and prolonging the life of the aluminum battery.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. An aluminum battery separator, comprising:

an air-permeable material, wherein an air permeability of the air-permeable material is between 0.1 sec/100 ml and 50 sec/100 ml, and the air-permeable material comprises a fiber material other than glass fiber, the air-permeable material is composed of a single material instead of a composite film, a fiber diameter of the air-permeable material is between 0.1 μm and 20 μm.

2. The aluminum battery separator according to claim 1, wherein the fiber material comprises a fiber non-woven material or a fiber woven material.

3. The aluminum battery separator according to claim 1, wherein the air-permeable material comprises cellulose, polyacrylonitrile, cellulose acetate, aramid, polyphenylene sulfide, and polyvinylalcohol dimethylformal.

4. The aluminum battery separator according to claim 1, wherein the single material is cellulose or polyacrylonitrile.

5. The aluminum battery separator according to claim 1, wherein an areal density of the air-permeable material is between 0.1 $g/m^2$ and 30 $g/m^2$.

6. The aluminum battery separator according to claim 1, wherein the air-permeable material is not a pore-forming material.

7. The aluminum battery separator according to claim 1, wherein a contact angle of the air-permeable material is not greater than 90 degrees.

8. The aluminum battery separator according to claim 1, wherein the air-permeable material does not comprise polyethylene or polypropylene.

* * * * *